(12) United States Patent
Sako

(10) Patent No.: US 7,117,368 B2
(45) Date of Patent: Oct. 3, 2006

(54) ANONYMOUS PARTICIPATION AUTHORITY MANAGEMENT SYSTEM

(75) Inventor: Kazue Sako, Tokyo (JP)

(73) Assignee: NEC Corporation, Tokyo (JP)

( * ) Notice: Subject to any disclaimer, the term of this patent is extended or adjusted under 35 U.S.C. 154(b) by 746 days.

(21) Appl. No.: 09/765,390

(22) Filed: Jan. 22, 2001

(65) Prior Publication Data

US 2001/0011351 A1  Aug. 2, 2001

(30) Foreign Application Priority Data

Jan. 21, 2000 (JP) ............................. 2000-012490

(51) Int. Cl.
*H04L 9/00* (2006.01)
(52) U.S. Cl. ...................... 713/180; 713/176; 713/179; 380/30; 380/277; 380/278
(58) Field of Classification Search ................ 713/176, 713/179, 180, 200, 201; 380/28, 277, 278, 380/30; 705/60, 64, 66, 74, 12
See application file for complete search history.

(56) References Cited

U.S. PATENT DOCUMENTS

| | | | | |
|---|---|---|---|---|
| 5,495,532 | A | * | 2/1996 | Kilian et al. .................. 380/30 |
| 5,682,430 | A | * | 10/1997 | Kilian et al. .................. 380/30 |
| 6,055,518 | A | * | 4/2000 | Franklin et al. ............... 705/37 |
| 6,317,833 | B1 | * | 11/2001 | Jakobsson .................... 713/181 |
| 6,636,969 | B1 | * | 10/2003 | Jakobsson et al. ........... 713/180 |
| 2001/0034708 | A1 | * | 10/2001 | Walker et al. ................. 705/51 |

OTHER PUBLICATIONS

Ramzan et al, Group Blind Digital Signatures: Theory and Applications, Laboratory of Computer Science, Massachusetts Institute of Technology, 1999.*

Grabbe, Introduction to Digital Cash, Talk given to the Libertarian PArty of Colorado, Apr. 20, 1997.*

J. Camenisch and M. Staadler, "Efficient group signature schemes for large groups", International Conference CRYPTO, 1997, (15) pages.

G. Ateniese and Gene Tsudik, "Some Open Issues and New Directions in Group Signature", International Conference Financial Cryptograph, 1999, (16) pages.

J. Kilian and E. Petrank, "Identity Escrow", International Conference CRYPTO, 1998, (pp. 158-185).

Ryuaki Okamoto et al., "Modern Encrypting", pp. 243-244 (Jun. 1997).

G. Anteniese et al., "Some Open Issues and New Directions in Group Signatures," Financial Cryptography, Third International Conference, FC '99 Proceedings, pp. 196-211, (XP002252934) Springer-Verlag, Berlin, Germany.

J. Camenisch et al., "Efficient Group Signature Schemes for Large Groups," Advances in Cryptology—Crypto '97 Proceedings of the Annual International Cryptology Conference, pp. 410-424 (XP000767547), Berlin, Germany.

(Continued)

*Primary Examiner*—Kim Vu
*Assistant Examiner*—Beemnet Dada
(74) *Attorney, Agent, or Firm*—Foley & Lardner LLP

(57) ABSTRACT

A system allowing a participant to participate anonymously in a plurality of sessions but to be detected that the same participant has participated more than once in the same session is disclosed. The participant authorizes individual data using secret information depending on session-related information. The reception subsystem determines whether received data is anonymous participation data authorized by the participant subsystem and further determines whether anonymous signatures of arbitrary two pieces of anonymous participation data are signed by an identical participant subsystem. The anonymous signature may include data generated by raising a session-dependent base to a power dependent on the secret information.

22 Claims, 7 Drawing Sheets

OTHER PUBLICATIONS

L.F. Cranor et al., "Sensus: A Security-Conscious Electronic Polling System for the Internet," Proceedings of the 13th Hawaii International Conference of Wailea, HI, 1997, pp. 561-570, (XP010271743).

Jinn-Ke Jan et al., "A Secure Electronic Voting Protocol with IC Cards," Security Technology, 1995, Proceedings IEEE, pp. 259-265, (XP010196424), New York, NY.

J. Kilian et al., "Identity Escrow," Advances in Cryptology, 18th Annual International Cryptology Conference, Proc. Lecture notes in Computer Science, vol. 1462, pp. 169-185, 1998, (XP000792174) Berlin, Germany.

Y. Mu et al., "Anonymous Secure E-Voting over a Network," Computer Security Applications Conference, 1998, Proceedings 14th Annual, pp. 293-299, 1998 (XP010318642), Los Alamitos, CA.

* cited by examiner

ANONYMOUS PARTICIPATION AUTHORITY MANAGEMENT SYSTEM

BACKGROUND OF THE INVENTION

1. Field of the Invention

The present invention relates to a participation authority management system for use in electronic access, electronic bidding, electronic lottery, electronic petition, electronic voting or the like.

2. Description of the Prior Art

Conventionally, an anonymous participation system using blind signature has been studied. Blind signature refers to a system in which a signer signs without seeing the signed contents. For example, in the case of electronic voting, data involved in the participation is the voting contents of the voter himself/herself.

Thus, electronic voting can be conducted as follows. First, a participant subsystem (presenter) authorized to vote proves before a manager subsystem that the presenter is authorized to vote and then has the manager subsystem sign the voting contents by section of blind signature.

A voting statement with the signature of this manager subsystem affixed is sent to a verification subsystem. The verification subsystem regards the voting statement submitted with the signature of the manager subsystem as a voting statement sent by an eligible voter To prevent an identical participant subsystem from participating in an identical voting session two or more times, it is determined that voting data which varies from one participant subsystem to another should be used and that the manager subsystem should issue a blind signature to each participant subsystem only once.

In the case where voting contents with the same signature are sent, this makes it possible to determine that the same participant subsystem has attempted to vote twice. Since blind signature is used, even the manager subsystem cannot know to which participant subsystem the voting statement with the signature has been issued, which makes it possible to maintain anonymity.

Likewise, an electronic voting system using anonymous certificates with blind signature is also under study. In the conventional example above, the participant subsystem needs to have the manager subsystem issue a blind signature every time the participant subsystem participates in voting, that is, for every voting session. Therefore, the following describes a conventional case where a participant subsystem can participate in electronic voting any number of times with a single registration procedure.

First, the participant subsystem proves before the manager subsystem that the participant subsystem is a participant subsystem authorized to anonymously participate, then has the manager subsystem sign its own public key by section of blind signature. The public key with this signature of the manager subsystem affixed is called "anonymous certificate".

Next, the participant subsystem signs the voting contents with its own secret key and sends the signed voting contents and the anonymous certificate to a verification subsystem. The verification subsystem confirms that the anonymous certificate submitted is a public key with the signature of the manager subsystem affixed and that the signature of the voting statement can be correctly verified based on this public key, and when the confirmation is obtained, regards this as a voting statement sent by an eligible voter. Whether an identical participant subsystem has not participated in an identical voting session more than once is confirmed by the absence of other voting statements based on the same anonymous certificate.

Use of blind signature makes it unknown even to the manager subsystem to which participant subsystem an anonymous certificate has been issued, which makes it possible to maintain anonymity. However, if an identical participant subsystem votes in two voting sessions using an identical anonymous certificate, it will be revealed that the same participant subsystem has participated.

Next, group signature will be explained below. This is a system in which even if two or more signatures are affixed it using an identical anonymous certificate, whether the same signer has signed or not is kept concealed. This technique is described in detail in a paper called "Efficient group signature schemes for large groups" in the international conference CRYPTO '97 by J. Camenisch and M. Stadler.

First, the participant subsystem proves before the manager subsystem that the participant subsystem is a participant subsystem that belongs to a group authorized to participate anonymously and then has the manager subsystem issue a group secret key.

Next, data to be sent is signed with this secret key and the signed data is sent to the verification subsystem.

The verification subsystem confirms that the data submitted has a signature verifiable by a group public key affixed and when the confirmation is obtained, this can be regarded as the data sent by a participant subsystem belonging to an eligible group. Use of group signature makes it impossible to identify the particular participant subsystem in the group to which the group secret key used for generating each signature is belonged, which makes it possible to maintain anonymity.

However, with this system even if an identical participant subsystem has sent data more than once to an identical session, there is no way to verify whether the two signatures are affixed by using an identical group secret key or not, and therefore this system cannot be used for applications such as electronic voting which must prevent double voting.

A technology similar to group signature, is escrow identification, which is described in detail in a paper called "Identity Escrow" in the international conference CRYPTO '98 by J. Kilian and E. Petrank. However, this technology does not provide section for determining whether two identification information pieces are issued from an identical participant subsystem or not, either.

A technology called "subgroup signature" is available, which is a technology using group signature whose number of signatures is equal to the number of different participant subsystems. This technology is described in detail in a paper called "Some open issues and new directions in group signatures" in the international conference Financial Cryptography '99 by G. Ateniese and G. Tsudik. However, since all participant subsystems provide signature for common data, this technology cannot be used for voting in which data to be sent varies from one participant to another.

SUMMARY OF THE INVENTION

As described above, there is no conventional technology that would allow a participant to participate in a plurality of sessions by a single registration procedure, detect whether there already exists data from the same participant, and conceal a participation relationship between sessions even if the participant participates in a plurality of sessions without this being detected, so as to be used for electronic voting and electronic bidding.

In the conventional technology where data to be sent is signed by section of blind signature, it is necessary to conduct registration processing for every session, while the conventional technology using an anonymous certificate is unable to conceal a participation relationship between sessions, group signature or escrow identification is unable to verify session participation by an identical participant, and the technology using subgroup signature is unable to allow each participant subsystem to create participation data independently.

The present invention has been achieved by taking into account the points described above and it is an object of the present invention to provide an anonymous participation authority management system in which a participant authorized to access or participate in a plurality of sessions can participate anonymously without the participant's name or participating relationship between the sessions being revealed, whereas it is possible to determine whether the same participant has participated more than once in the same session.

In other words, the present invention provides an anonymous participation authority management system allowing participants to participate in a plurality of sessions with a single registration procedure, detecting any identical participant who has participated in an identical session more than once, and yet concealing a participation relationship between sessions, so as to be used for electronic voting, electronic bidding, and the like.

According to the present invention, a system includes: a participant subsystem that is authorized to anonymously participate in a plurality of sessions using secret information: and a reception subsystem that determines whether it is acceptable for the participant subsystem to participate in a session, wherein the participant subsystem includes an anonymous signing section for authorizing individual data using the secret information depending on session-related information to produce anonymous participation data with anonymous signature, and the reception subsystem includes: an anonymous signature determining section for determining whether received data is anonymous participation data with anonymous signature authorized by the participant subsystem: and a sender match determining section for determining whether anonymous signatures of arbitrary two pieces of anonymous participation data are signed by an identical participant subsystem.

The anonymous signature may include data that is generated by a predetermined expression using the session-related information and the secret information, wherein the sender match determining section checks the data included in the anonymous signature of received anonymous participation data. The predetermined expression may be represented by raising a session-dependent base to a power that is dependent on the secret information.

According to a first embodiment of the present invention, the anonymous signing section may include: a generator creating section for creating a session-dependent generator depending on the session-related information; a group signing section for signing the individual data using the session-dependent generator and the secret information to produce anonymous participation data, wherein the anonymous participation data includes data obtained by raising the session-dependent generator to a power determined by the secret information; and a linkage data generating section for generating linkage data indicating a relationship among the session-dependent generator and a generator determined by the individual data and/or the session-related information.

The secret information is represented by (x, y, v) that satisfies: $v=(y+\delta)^{1/e}$ mod n, where $y=a^x$ mod n, n is a product of two prime numbers as used in the RSA cryptography, g is a generator that generates a cyclic group of order n, a is an integer mutually prime to n, e is an integer mutually prime to the Euler number of n, and $\delta$ is a constant other than 1, the generator creating section creates a session-dependent generator $g_A$ corresponding to a session A and a generator $g_A$ is generated based on the individual data m and/or the session A, the group signing section sets $z=g_A^y$ and generates a first proof statement $$V_1 = SKLOGLOG(z, g_A, a)[\alpha : z = g_A^{(a^\alpha)}] \quad (1)$$

proving the knowledge of $\alpha$ satisfying $z = g_A^{(a^\alpha)}$, and a second proof statement $$V_2 = SKROOTLOG(z^* g_A^\delta, g_A, e)[\beta : z^* g_A^\delta = g_A^{(\beta^e)}] \quad (1)$$

proving the knowledge of $\beta$ satisfying $z^* g_A^\delta = g_A^{(\beta^e)}$, the linkage data generating section sets $z_1 = g_m^y$, and generates a third proof statement $$V_3 = SKREP(z_1/z, g_m/g_A)[\gamma : z_1/z = (g_m/g_A)^\gamma] \quad (1)$$

proving the knowledge of $z_1$ and z have the same power to the bases $g_m$ and $g_A$, respectively, wherein the anonymous participation data is defined as (A, m, z, $z_1$, $V_1$, $V_2$, $V_3$). In this case, the anonymous signature determining section checks $V_1$, $V_2$, and $V_3$ of the anonymous participation data to determine whether received data is anonymous participation data with anonymous signature authorized by the participant subsystem. The sender match determining section checks z of the anonymous participation data to determine whether anonymous signatures of arbitrary two pieces of anonymous participation data are signed by an identical participant subsystem.

According to a second embodiment, the anonymous signing section may include: a generator creating section for creating a generator depending on the session-related information; and a group signing section for signing the individual data using the generator and the secret information to produce anonymous participation data, wherein the anonymous participation data includes data obtained by raising the session-dependent generator to a power determined by the secret information.

In the case where he secret information is represented by (x, y, v) that satisfies: $v=(y+\delta)^{1/e}$ mod n, where $y=a^x$ mod n, the individual data is denoted by m, n is a product of two prime numbers as used in the RSA cryptography, g is a generator that generates a cyclic group of order n, a is an integer mutually prime to n, e is an integer mutually prime to the Euler number of n, and $\delta$ is a constant: other than 1, the generator creating section creates a session-dependent generator $g_A$ corresponding to a session A, the group signing section sets $z=g_A^y$ and generates a first proof statement $$V_1 = SKLOGLOG(z, g_A, a)[\alpha : z = g_A^{(a^\alpha)}](m)$$

proving the knowledge of $\alpha$ satisfying $z = g_A^{(a^\alpha)}$, and a second proof statement $$V_2 = SKROOTLOG(z^* g_A^\delta, g_A, e)[\beta : z^* g_A^\delta = g_A^{(\beta^e)}](m)$$

proving the knowledge of β satisfying $z^* g_A^{\delta} = g_A^{(\beta^e)}$, wherein the anonymous participation data 13 is designated as (A, m, z, $V_1$, $V_2$).

According to a third embodiment of the present invention, the anonymous signing section may include: a generator creating section for creating a session-dependent generator depending on the session-related information; an escrow identifying section for signing the individual data using the session-dependent generator and the secret information to produce anonymous participation data, wherein the anonymous participation data includes data obtained by raising the session-dependent generator to a power determined by the secret information; and a linkage data generating section for generating linkage data indicating a relationship among the session-dependent generator and a generator determined by the individual data and/or the session-related information.

The secret information is represented by (a, b) that satisfies $b = (a^a - \delta)^{1/a}$ mod n, where n is a product of two prime numbers as used in the RSA cryptography, g is a generator that generates a cyclic group of order n, a is an integer mutually prime to n, e is an integer mutually prime to the Euler number of n, and δ is a constant other than 1, the generator creating section creates a session-dependent generator $g_A$ corresponding to a session A and a generator $g_m$ is generated based on the individual data m and/or the session A, the escrow identifying section sets $z_\alpha = g_A^{(a^e)}$ and generates a first proof statement $$V_1 = SKROOTLOG(z_a, g_A, e)[\alpha : z_a = g_A^{(a^e)}] \qquad (1)$$

proving the knowledge of α satisfying $z_a = g_A^{(a^e)}$, and sets $z^b = g_A^{(b^e)}$ and generates a second proof statement $$V_2 = SKROOTLOG(z_b, g_A, e)[\beta : z_b = g_A^{(b^e)}] \qquad (1)$$

proving the knowledge of β satisfying $z_b = g_A^{(b^e)}$, and the linkage data generating section sets $z_a = g_m^{(a^e)}$ and generates a third proof statement $$V_3 = SKREP(z_c/z_a, g_m/g_A)[\gamma : z_c/z_a = (g_m/g_A)^\gamma] \qquad (1)$$

proving the knowledge of $z_a$ and $z_c$ having the same power to the bases $g_A$ and $g_m$, respectively, wherein the anonymous participation data is defined as (A, m, $z_a$, $z_b$, $z_c$, $V_1$, $V_2$, $V_3$). In this case, the anonymous signature determining section determines whether $z_a^* z_b = g_A^\delta$ is satisfied and, checks $V_1$, $V_2$, and $V_3$ of the anonymous participation data to determine whether received data is anonymous participation data with anonymous signature authorized by the participant subsystem. The sender match determining section checks one of $z_a$ and $z_b$ of the anonymous participation data to determine whether anonymous signatures of arbitrary two pieces of anonymous participation data are signed by an identical participant subsystem.

According to a fourth embodiment of the present invention, the anonymous signing section may include: a generator creating section for creating a session-dependent generator depending on the session-related information; and an escrow identifying section for signing the individual data using the session-dependent generator and the secret information to produce anonymous participation data, wherein the anonymous participation data includes data obtained by raising the session-dependent generator to a power determined by the secret information.

The secret information is represented by (a, b) that satisfies $b = (a^e - \delta)^{1/e}$ mod n, where n is a product of two prime numbers as used in the RSA cryptography, g is a generator that generates a cyclic group of order n, a is an integer mutually prime to n, e is an integer mutually prime to the Euler number of n, and δ is a constant other than 1, the generator creating section creates a session-dependent generator $g_A$ corresponding to a session A, the escrow identifying section sets $z_a = g_A^{(a^e)}$ and generates a first proof statement $$V_1 = SKROOTLOG(z_a, g_A, e)[\alpha : z_a = g_A^{(a^e)}] \qquad (m)$$

proving the knowledge of α satisfying $z_a = g_A^{(a^e)}$, and sets $z^b = g_A^{(b^e)}$ and generates a second proof statement $$V_2 = SKROOTLOG(z_b, g_A, e)[\beta : z_b = g_A^{(b^e)}] \qquad (m)$$

proving the knowledge of β satisfying $z_b = g_A^{(b^e)}$, wherein the anonymous participation data is defined as (A, m, $z_a$, $z_b$, $V_1$, $V_2$).

DETAILED DESCRIPTION OF THE PREFERRED EMBODIMENTS

Figure 1:
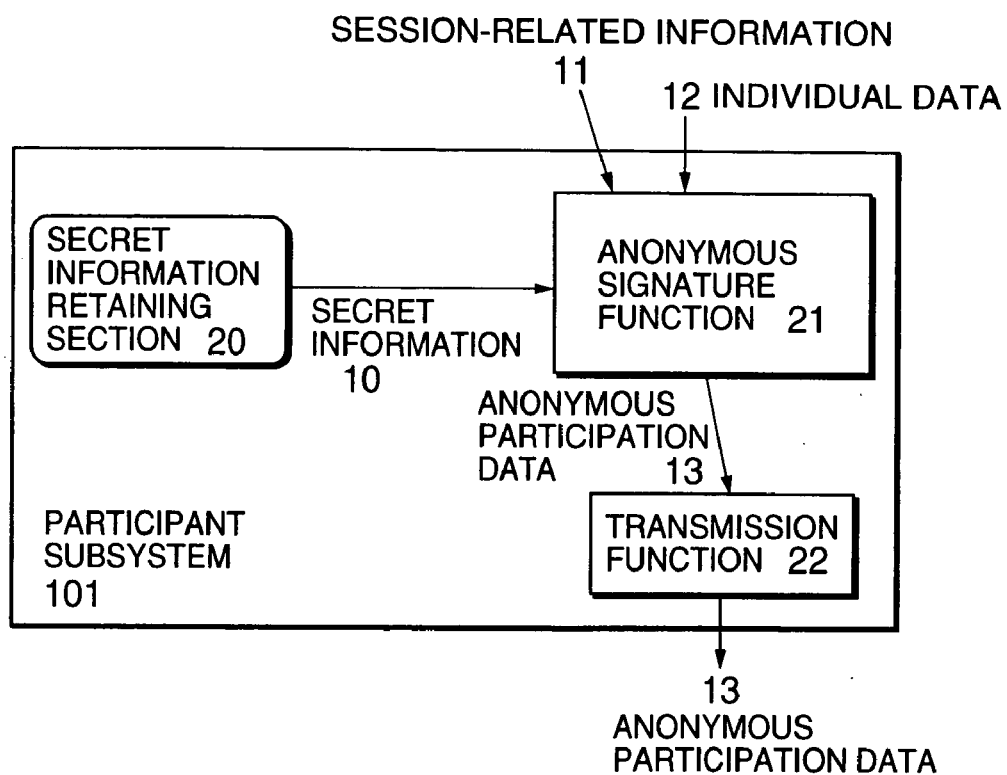
FIG. 1 is a block diagram showing a configuration of an embodiment of a participant subsystem according to the present invention.
Figure 2:
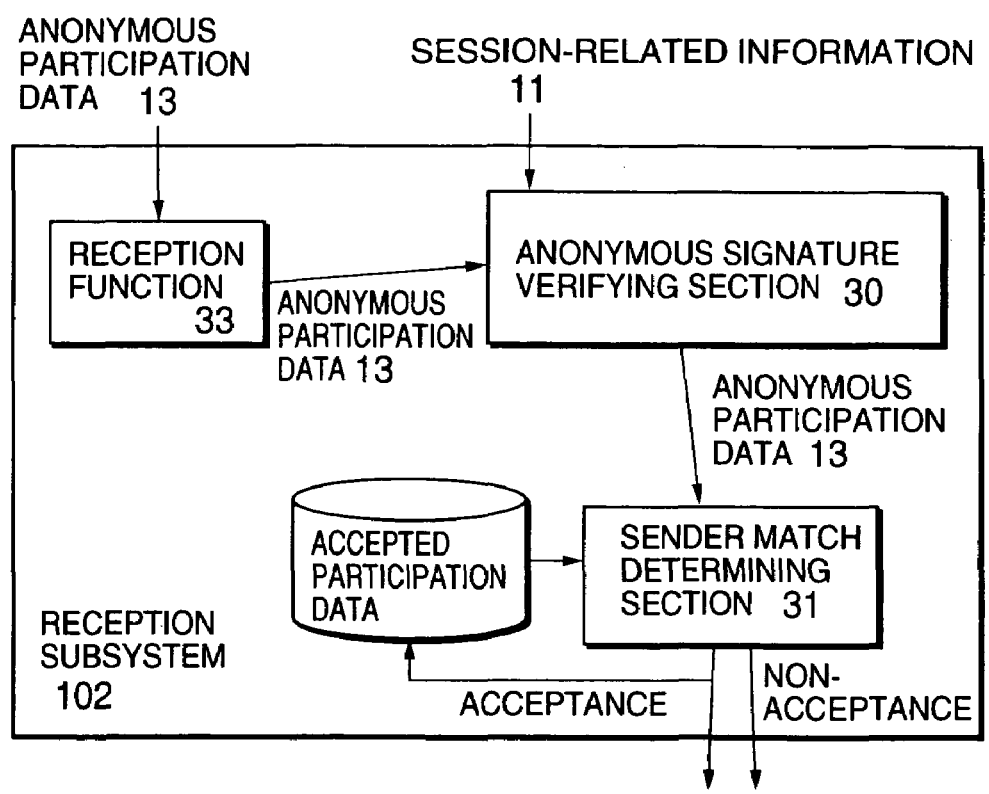
FIG. 2 is a block diagram showing a configuration of an embodiment of a reception subsystem according to the present invention.
Figure 3:
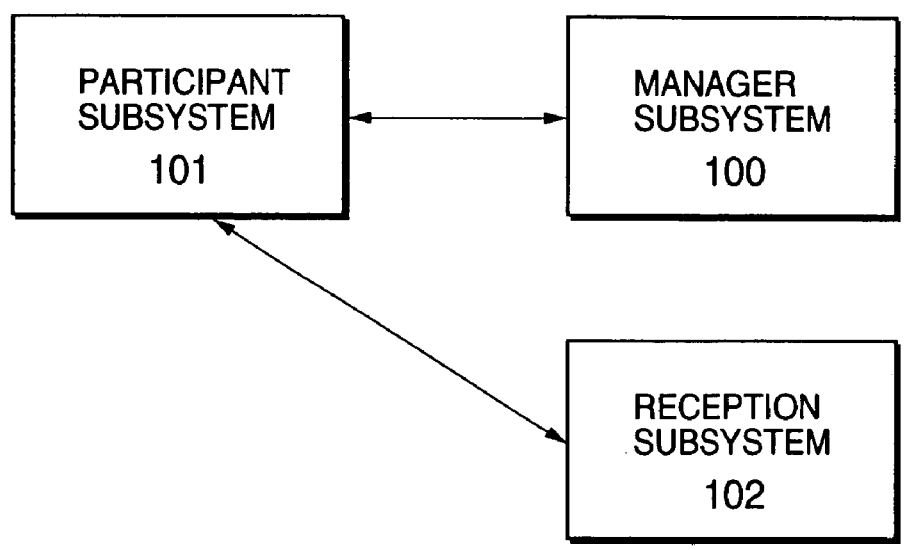
FIG. 3 is a block diagram showing a configuration of an embodiment of a system according to the present invention.

In order to clarify the objects, features and advantages of the present invention, embodiments of the present invention will be explained in detail below with reference to the attached drawings. A schematic system according to an embodiment of the present invention is shown in FIG. 1 to FIG. 3. FIG. 1 shows a participant subsystem 101 and FIG. 2 shows a reception subsystem 102. FIG. 3 shows a conceptual diagram of the system.

For example, in the case where this anonymous participation authority management system is applied to a voter management system in electronic voting, the participant subsystem corresponds to a voter subsystem and each eligible voter is given secret information from a manager subsystem beforehand and the reception subsystem performs voting reception.

A session corresponds to each election event (nationwide election, local government election, etc.) and session-related information includes information specifying the election session and is information common to all or a certain range of voters (e.g., voters in the same election administrative area), and individual data is voting data, which varies from one voter to another. Unlike conventional "digital signature" in which a signer name is identified, in "anonymous signature", a signer name is not identified and remains anonymous, but the "anonymous signature" indicates that it assures (authorizes) as a signature that data has been certainly created by an anonymous person who has participation authority and has not been tampered by other people. There are two kinds of digital signature systems, one in which data to be signed is expressly separated from signature data, and the other in which data to be signed is indirectly included in signature data. Thus, suppose the anonymous signature, or participation data with an anonymous signature assigned described here includes data subject to anonymous signature.

With reference to FIG. 1 and FIG. 2, this participant subsystem 101 has secret information 10 given by communicating beforehand with the manager subsystem 100 in secret information retaining section 20, generates anonymous participation data 13 obtained by authorizing through the anonymous signature function 21 session-related information 11 of the session in which the participant wants to participate and individual data 12 which is to be entered in the session in which the participant wants to participate using a secret key 10 retained in the secret key retaining section 20 and anonymously sends this anonymous participation data 13 to the reception subsystem 102.

The reception subsystem 102 receives this participation data and verifies through the anonymous signature verifying section 30 that this includes the individual data authorized by the participant subsystem authorized to anonymously participate in the relevant session.

Then, it is determined whether the participant previously participated in the session or not using the sender match determining section 31 that determines whether the received participation data is sent or not by the same participant subsystem that sent the participation data.

In the case of voting, if the participant did not participate before, the relevant participation data sent is accepted and if the participant participated before, this is accepted and notified.

Or it is also possible to receive all verified data first and then accept only the data that the sender match determining section 31 has confirmed that the same participant subsystem is not found in the received participation data.

In other cases such as bidding, it is also possible to accept only the data involved in the first participation or validate the latest participation data or select only one from the participation data of the same participant subsystem and validate according to a certain standard. Of course, verification of participation data using the anonymous signature verifying section can be performed at any time after reception.

Furthermore, in the case where this anonymous participation authority management system is applied to a bidder management system of electronic bidding; the participant subsystem corresponds to a bidder subsystem and each eligible bidder is given secret information from the manager subsystem beforehand and the reception subsystem performs bidding reception.

The session corresponds to each bidding item, session-related information includes information that specifies the bidding session and is information common to all bidders, and individual data corresponds to bidding data which varies from one bidder to another.

For example, in the case where this anonymous participation authority management system is applied to an applicant management system in electronic lottery, the participant subsystem corresponds to the applicant subsystem, each eligible applicant is given secret information from the manager subsystem beforehand and the reception subsystem performs application reception.

The session corresponds to each lottery item, session-related information includes information that specifies the lottery session and is information common to all applicants, and individual data corresponds to application data which varies from one applicant to another.

First Embodiment

Figure 4:
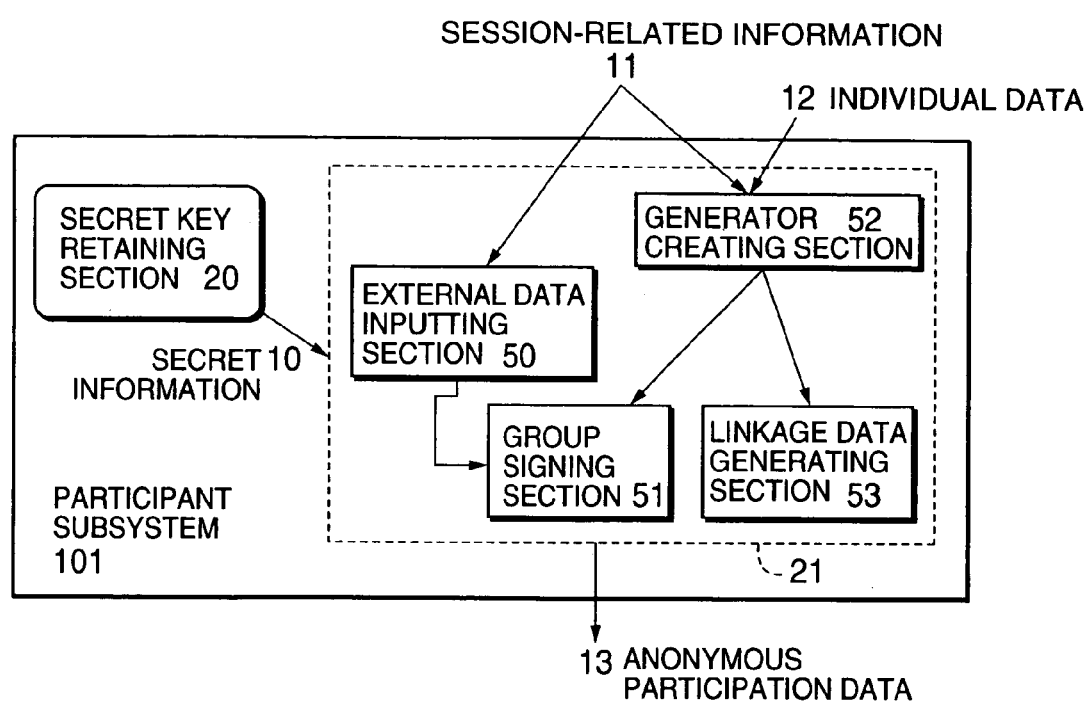
FIG. 4 is a block diagram of a participant subsystem showing a configuration of a first embodiment of an anonymous signature function according to the present invention.

As shown in FIG. 4, a case where group signature is applied will be described as a specific example. Operation of this embodiment will be explained below.

As group signature, a system which J. Camenisch and M. Stadler introduced in a paper called "Efficient group signature schemes for large groups" in the international conference CRYPTO '97 is known.

As described in the above document, common constants $(g, a, e, n, \delta)$ are required where n is a product of two prime numbers as used in the RSA cryptography, g is a generator that generates a cyclic group of order n, a is an integer mutually prime to n, e is an integer mutually prime to the Euler number of n, and $\delta$ is a constant other than 1.

Then, the manager system 100 generates these common constants and designates the prime factor of n as the secret information of the manager system. The method of generating these common constants is described in detail in the above document.

Given the above common constants $(g, a, e, n, \delta)$, each participant subsystem 101 communicates with a manager system that knows the prime factor of n and thereby acquires secret information 10 $(x, y, v)$ that satisfies:

$$v=(y+\delta)^{1/e} \bmod n$$

where $y=a^x \bmod n$.

Here, as the method of acquiring the secret information $(x, y, z)$, the manager system may generate all the information and distribute it to participant subsystems, or each participant subsystem may present only y while keeping x a secret and have the manager system calculate v from y. Furthermore, it is also possible to acquire the secret information $(x, y, v)$ by using a blind signature technique without even revealing y.

Then, the proof system which will be used below will be explained first.

$$SKREP(y,g)[\alpha:y=g^\alpha](m)$$

means proving the knowledge of $\alpha$ satisfying $y=g^\alpha$ using $(y, g, m)$, where m is an arbitrary number.

$$SKLOGLOG(y,g,a)[\alpha:y=g^{(a^\alpha)}](m)$$

means proving the knowledge of $\alpha$ satisfying $y=g^{(a^\alpha)}$ using $(y, g, a, m)$, where m is an arbitrary number.

Next, $$SKROOTLOG(y,g,e)[\alpha:y=g^{(\alpha^e)}](m)$$

means proving the knowledge of $\alpha$ satisfying $y=g^{(\alpha^e)}$ using $(y, g, e, m)$, where m is an arbitrary number.

Since the method of creating a specific proof statement and the method of verifying the proof statement are described in detail in the above document, and these methods are not directly related to the present invention, they are not further described here.

Then, the calculation as shown in FIG. 4 will be carried out as the anonymous signature function 21 using session management information A (11) and individual data m (12).

First, a generator $g_A$ corresponding to session A is acquired by the generator creating section 52 and then $g_m$ is generated by $g_m$=Hash(m).

Then, the group signing section 51 sets $z=g_A{}^y$ and generates a proof statement $$V_1 = SKLOGLOG(z, g_A, a)[\alpha : z = g_A{}^{(a^\alpha)}] \quad (1)$$

proving the knowledge of $\alpha$ satisfying $z = g_A{}^{(a^\alpha)}$, and a proof statement $$V_2 = SKROOTLOG(z^* g_A{}^\delta, g_A, e)[\beta : z^* g_A{}^\delta = g_A{}^{(\beta^e)}] \quad (1)$$

proving the knowledge of $\beta$ satisfying $z^* g_A{}^\delta = g_A{}^{(\beta^e)}$.

Here, constant 1 to be input to SKLOGLOG and SKROOTLOG is given as session-related information and is a constant to become the output from the external data inputting section 50.

Then, the linkage data generating section 53 sets $z_1 = g_m{}^y$ and generates a proof statement $$V_3 = SKREP(z_1/z, g_m/g_A)[\gamma : z_1/z = (g_m/g_A)^\gamma] \quad (1)$$

proving the knowledge of $z_1$ and $z$ have the same power to the bases $g_m$ and $g_A$, respectively.

As the output of the above processing, participation data 13 is designated as (A, m, z, $z_1$, $V_1$, $V^2$, $V_3$). In the case where A is apparent, A need not particularly be added to the participation data.

Furthermore, in the generator creating section 52, $g_A$ can also be given as part of the session-related information or it can be generated as $g_A$=Hash(A).

The reception subsystem that has received this participation data 13 acquires $g_A$ from A and confirms through the anonymous signature verifying section 30 that the certification statements $V_1$, $V_2$ and $V_3$ are valid.

Then, when the same z exists in a plurality of participation data, the sender match determining section 31 can determine that these participation data have been sent by the same participant subsystem. This is because z included in the participation data from the same participant subsystem is identical with respect to the same session irrespective of the value of the individual data m.

As shown above, when the participant subsystem participates in a different session using the same secret information 10 (x, y, v), the linkage is not ascertained (because it is difficult to discriminate numbers obtained by raising different bases to same power from numbers obtained by other calculations). When the participant subsystem participates in the same session, it is possible to construct an anonymous participation authority management system in which the linkage is ascertained. Furthermore, a system of invalidating the issued anonymous participation secret information is also described in the above document.

Furthermore, it is easy for those skilled in the art to think of variations of the above system. For example, even if $g_m$ is generated by $g_m$=Hash(A||m) through the generator creating section 52, the effect remains unchanged. Here, "||" denotes concatenation. Furthermore, if $g_A$ and $g_m$ are generators over a finite field, which is uniquely determined by A and m, respectively, or A or A and m, $g_A$ and $g_m$ need not use any hash function. Moreover, constant (1) is used as an example of the output of the external data inputting section 50 to generate $V_1$, $V_2$ and $V_3$, but any number or any variable such as $g_A$, $g_m$, y and z can be used if agreed to do so beforehand.

Furthermore, it is also possible to change the manner in which $g_m$ and $g_A$ are used by the generator creating section 52. For example, the generator creating section 52 may generate $g_m$=Hash(m) from individual data m, and generate $g_A$ by $g_A$=Hash(A) using session-related information A. Next, the group signing section 51 may set $z_2 = g_m{}^y$, and generate a proof statement $V_1 = SKLOGLOG(z_2, g_m, a)[\alpha : z_2 = g_m{}^{(a^\alpha)}](1)$ proving the knowledge of $\alpha$ satisfying $z_2 = g_m{}^{(a^\alpha)}$, and a proof statement $V_2 = SKROOTLOG(z_2 * g_m{}^\delta, g_m, e)[\beta : z_2 * g_m{}^\delta = g_m{}^{(\beta^e)}](1)$ proving the knowledge of $\beta$ satisfying $z_2 * g_m{}^\delta = g_m{}^{(\beta^e)}$. Finally, the linkage data generating section 52 may set $z_3 = g_A{}^y$ and generate a proof statement $V_3 SKREP(z_2/z_3, g_m/g_A)[\gamma : z_2/z_3 = (g_m/g_A)^\gamma](1)$ proving the knowledge of $z_2$ and $z_3$ having the same power to the bases $g_m$ and $g_A$, respectively. The participation data 13 is then designated as (A, m, $z_2$, $z_3$, $V_1$, $V_2$, $V_3$). However, the effect remains the same.

In this case, the sender match determining section 31 will check whether $z_3$ in the participation data duplicates.

Second Embodiment

Figure 5:
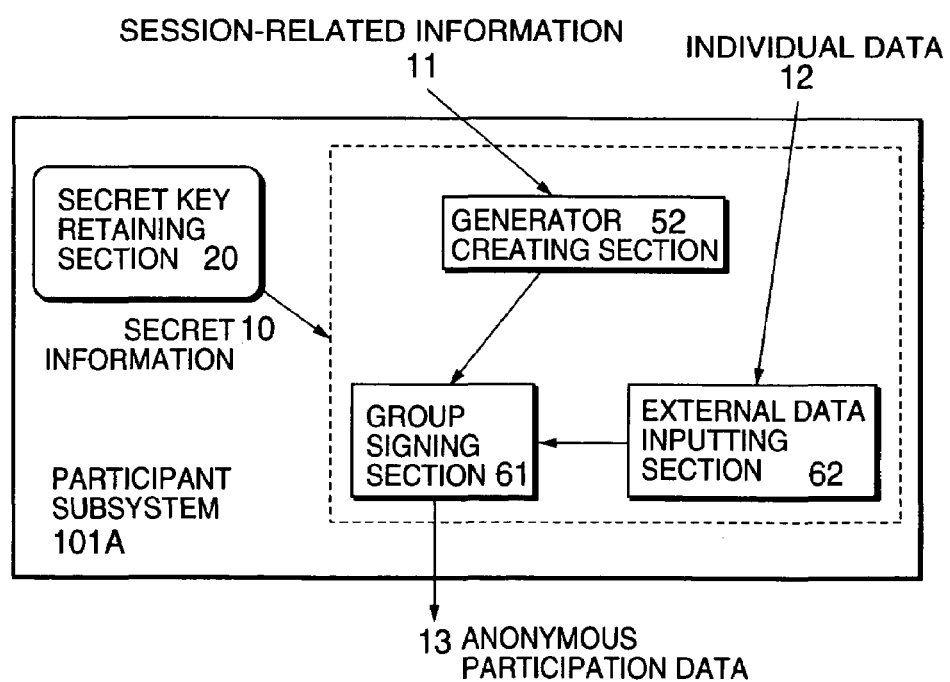
FIG. 5 is a block diagram of a participant subsystem showing a configuration of a second embodiment of an anonymous signature function according to the present invention.

Furthermore, there can also be an example seeking to improve the efficiency. An anonymous signature function 21 using session management information A and individual data m will be explained with reference to the participant subsystem 101A in FIG. 5, Referring to FIG. 5, the generator creating section 52 acquires a generator $g_A$ corresponding to session A. Next, the output from the external data inputting section 62 is set to m. The group signing section 61 sets $z=g_A{}^y$ and generates a proof statement $$V_1 SKLOGLOG(z, g_A, a)[\alpha : z = g_A{}^{(a^\alpha)}] \quad (m)$$

proving the knowledge of $\alpha$ satisfying $z = g_A{}^{(a^\alpha)}$, and a proof statement $$V_2 = SKROOTLOG(z^* g_A{}^\delta, g_A, e)[\beta : z^* g_A{}^\delta = g_A{}^{(\beta^e)}] \quad (m)$$

proving the knowledge of $\beta$ satisfying $z^* g_A{}^\delta = g_A{}^{(\beta^e)}$. The participation data 13 is designated as (A, m, z, $V_1$, $V_2$). In the case where A is apparent, A need not particularly be added to the participation data. Furthermore, $g_A$ can also be given together with A or generated as $g_A$=Hash(A).

In this case, the participation data is not only shortened but it is necessary to verify the validity of only proof statements $V_1$ and $V_2$ by the anonymous signature verifying section 30, which will improve the efficiency. Moreover, the output from the external data inputting section 62 need not be made dependent solely on the individual data but can also include session management information A, if it is also included during verification.

Third Embodiment

The system can also be designed based on an escrow identification system. The escrow identification technique is described in detail by J. Kilian and E. Peltrank in a paper called "Identity Escrow" in the international conference CRYPTO '98.

In this example, as described above, common constants (g, a, e, n, $\delta$) are required where n is a product of two prime numbers used in RSA cryptography, g is a generator that generates a cyclic group of order n, e is an integer mutually prime to the Euler number of n, $\delta$ is a constant other than 1.

Then, the manager system generates these common constants and designates the prime factor of n as the secret information of the manager system.

Given the above common constants (g, e, n, δ), each participant subsystem communicates with a manager system that knows the prime factor of n and thereby acquires secret information 10 (a, b) that satisfies $b=(a^e-\delta)^{1/e} \bmod n$.

Here, as the method of acquiring the secret information (a, b), it is possible for the manager system to generate all the information and distribute it to participant subsystems or it is possible to acquire the secret information (a, b) by even hiding a using a blind signature technique.

Figure 6:
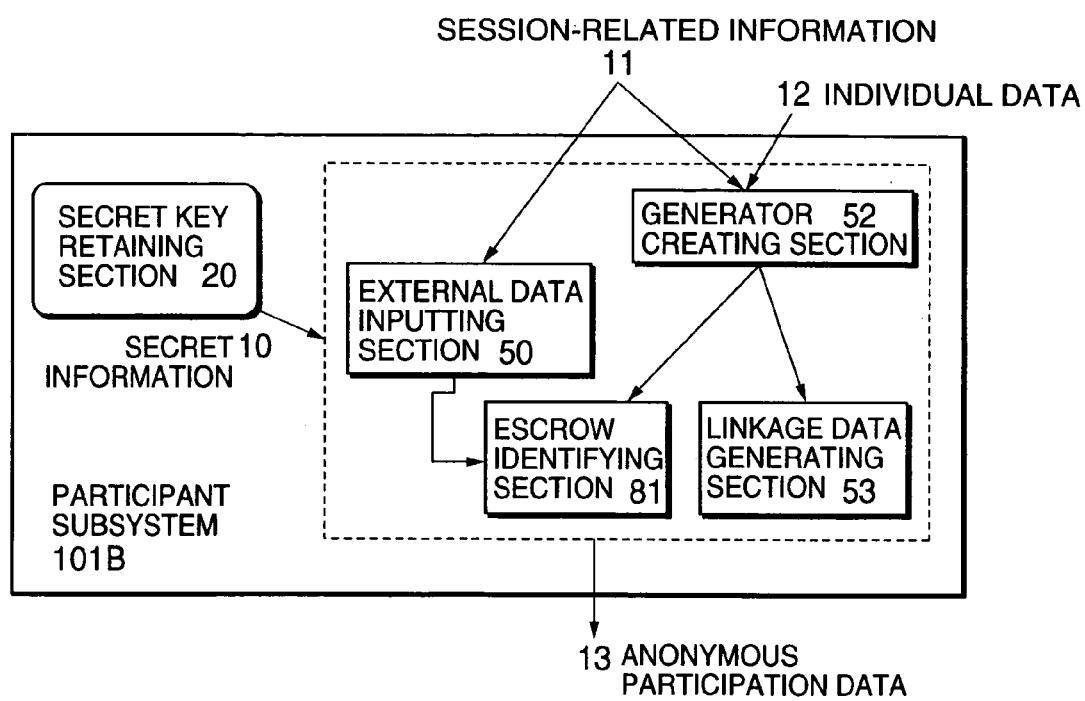
FIG. 6 is a block diagram of a participant subsystem showing a configuration of a third embodiment of the anonymous signature function according to the present invention.

In the following example, supposing an anonymous signature function 21 using session management information A and individual data m, the following operation is performed by the participant subsystem 101B as shown in FIG. 6.

Referring to FIG. 6, a generator $g_A$ corresponding to session A is acquired by the generator creating section 52 and then $g_m$ is generated by $g_m=\text{Hash}(m)$.

Next, the escrow identifying section 81 sets $z_a=g_A^{(a^e)}$ and generates a proof statement $$V_1=SKROOTLOG(z_a,g_A,e)[\alpha:z_a=g_A^{(a^e)}] \quad (1)$$

proving the knowledge of α satisfying $z_a=g_A^{(a^e)}$, and sets $z^b=g_A^{(b^e)}$ and generates a proof statement $$V_2=SKROOTLOG(z_e,g_A,e)[\beta:z_b=g_A^{(b^e)}] \quad (1)$$

proving the knowledge of β satisfying $z_b=g_A^{(b^e)}$.

Then, the linkage data generating section 53 sets $z_c=g_m^{(a^e)}$ and generates a proof statement $$V_3=SKREP(z_c/z_a,g_m/g_A)[\gamma:z_c/z_a=(g_m/g_A)^\gamma](1)$$

proving the knowledge of $z_a$ and $z_n$ having the same power to the bases $g_A$ and $g_m$, respectively. The participation data 13 is designated as (A, m, $z_a$, $z_b$, $z_c$, $V_1$, $V_2$, $V_3$). In the case where A is apparent, A need not particularly be added to the participation data. Furthermore, $g_A$ can be given as part of the session-related information or it can also be generated as $g_A=\text{Hash}(A)$.

The reception subsystem that has received this participation data 13 acquires $g_A$ from A and confirms through the anonymous signature verifying section 30 that $z_a/z_b=g_A^\delta$ is satisfied and proof statements $V_1$, $V_2$ and $V_3$ are valid.

Then, when the same $z_a$ exists in a plurality of participation data, the sender match determining section 31 can determine that these participation data have been sent by the same participant subsystem. This is because $z_a$ included in the participation data from the same participant subsystem is identical with respect to the same session irrespective of the value of the individual data m.

Furthermore, even if the sender match determining section 31 detects $z_b$ instead of $z_a$, the same effect is obtained.

As shown above, when the participant subsystem participates in a different session using the same secret information 10 (a, b), the linkage is not ascertained (because it is difficult to distinguish numbers obtained by raising the different bases to the same power from numbers obtained by other calculations). It is possible to construct an anonymous participation authority management system in which the linkage is ascertained when the participant subsystem participates in the same session. Furthermore, unlike the aforementioned example, the efficiency is improved by using only SKROOTLOG, which is more efficient than SKLOGLOG.

Furthermore, a system of invalidating the issued secret information for anonymous participation is also discussed in the above document.

Furthermore, it is easy for those skilled in the art to think of variations of the above system. For example, even if $g_m$ is generated by $g_m=\text{Hash}(A\|m)$ through the generator creating section 52, the effect remains unchanged. Here, "∥" denotes concatenation. Furthermore, if $g_A$ and $g_m$ are generators over a finite field, which is uniquely determined by A and m, respectively, or A or A and m, $g_A$ and $g_m$ need not use any hash function. Moreover, constant (1) is used as an example of the output of the external data inputting section 50 to generate $V_1$, $V_2$ and $V_3$, but any number or any variable such as $g_A$, $g_m$, y and z can be used if agreed to do so beforehand.

Furthermore, it is also possible to change the manner in which $g_m$ and $g_A$ are used by the generator creating section 52. For example, the generator creating section 52 may generate $g_A$ by $g_A=\text{Hash}(A)$ using session-related information A, and $g_m=\text{Hash}(m)$ from individual data m. Next, the escrow identifying section 81 may set $z_a=g_m^{(a^e)}$ and generate a proof statement $V_1=SKROOTLOG(z_a,g_m,e)[\alpha:z_a=g_m^{(a^e)}]$ (1) proving the knowledge of α satisfying $z_a=g_m^{a^e}$, and set $z_b=g_m^{(b^e)}$ and generate a proof statement $V_2=SKROOTLOG(z_b,g_m,e)[\beta:z_b=g_m^{(b^e)}](1)$ proving the knowledge of β satisfying $z_b=g_m^{(b^e)}$.

Finally, the link data generating section 53 may set $z^c=g_A^{(a^e)}$ and generate a proof statement $V_3=SKREP(z_c/z_a, g_A/g_m)[\gamma: z_c/z_a=(g_A/g_m)^\gamma](1)$ proving the knowledge of $z_a$ and $z_c$ having the same power to the bases $g_m$ and $g_A$, respectively. The participation data 13 is then designated as (A, m, $z_a$, $z_b$, $z_c$, $V_1$, $V_2$, $V_3$). However, the effect remains the same.

In this case, the sender match determining section 31 will check whether $z_o$ in the participation data duplicates.

Fourth Embodiment

Furthermore, there can also be an example seeking to improve the efficiency. An anonymous signature function 21 using session management information A and individual data m will be explained with reference to the participant subsystem 101C in FIG. 7.

Figure 7:
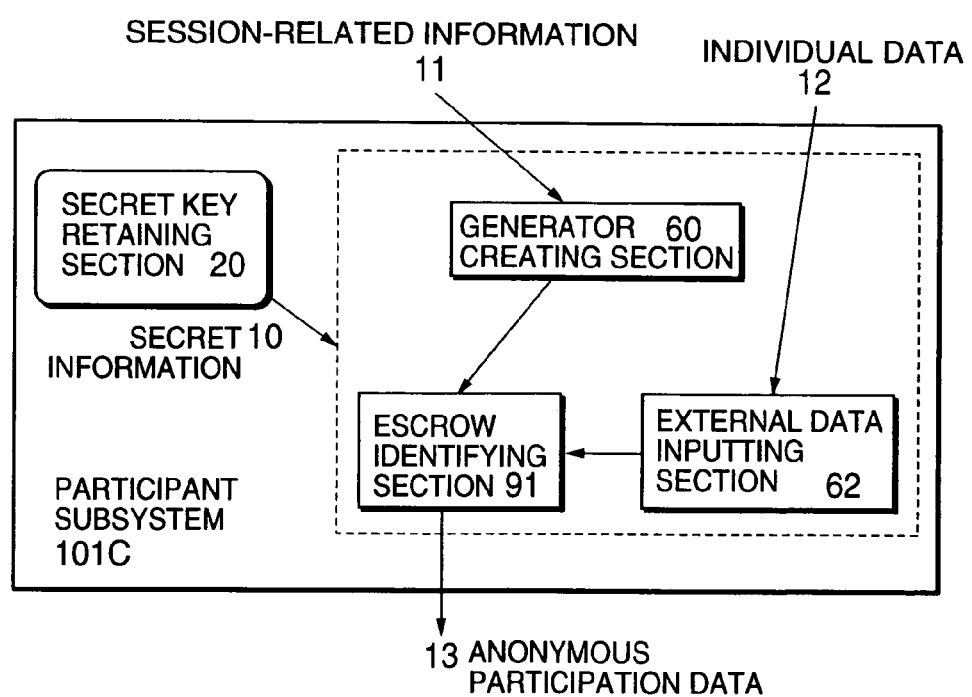
FIG. 7 is a block diagram of a participant subsystem showing a configuration of a fourth embodiment of the anonymous signature function according to the present invention.

Referring to FIG. 7, the generator creating section 60 acquires a generator $g_A$ corresponding to session A.

Next, the output from the external data inputting section 62 is set to m. The escrow identifying section 91 sets $z^a=g_A^{(a^e)}$ and generates a proof statement $$V_1=SKROOTLOG(z_a,g_A,e)[\alpha:z_a=g_A^{(a^e)}] \quad (m)$$

proving the knowledge of α satisfying $z_a=g_A^{(a^e)}$, and sets $z^b=g_A^{(\beta^e)}$ and generate a proof statement $$V_2=SKROOTLOG(z_b,g_A,e)[\beta:z_b=g_A^{(\beta^e)}] \quad (m)$$

proving the knowledge of β satisfying $z_b=g_A^{(\beta^e)}$. The participation data 13 is then designated as (A, m, $z_a$, $z_b$, $V_1$, $V_2$). In the case where A is apparent, A need not particularly be added to the participation data. Furthermore, $g_A$ can also be given together with A or generated as $g_A=\text{Hash}(A)$.

In this case, the participation data is not: only shortened but it is necessary to verify the validity of only proof statements $V_1$ and $V_2$ by the anonymous signature verifying section 30, which will improve the efficiency, Another merit of this example is that secret information specific to the reception system is not necessary in the anonymous signature verifying section and sender match determining section. Therefore, if all participation data is disclosed to the public in order to verify the validity of electronic voting, everybody can verify that all participation data are votes of valid eligible voters and no identical eligible voter has performed double voting. Such a system can also be applied to an electronic petition.

In electronic bidding, there can be such illegality that a reception system receives a plurality of participation data (bidding data) from a specific participant subsystem and leaves the most advantageous data from among those data later. In this case, even if everybody can use the sender match determining section, it is not possible to detect this illegality. In this case, before unsealing (that is, before it is found which data is advantageous), the received participation data is identified and made unchangeable or a receipt for the received participation data is issued in a form dependent on the previous participation data, and if the participation data is deleted, there will be a mismatch with the receipts of other participants, thus disclosing the illegality.

This embodiment is introduced as an operation on a general number field, but it is obvious to those skilled in the art that even if this embodiment is read as an operation on an elliptic curve or as an operation on another group or field, the same effect can be obtained.

It is apparent that the present invention is not limited to each of the above embodiments but can be modified in various manners without departing from the spirit and/(or scope of the technological concept of the present invention.

As described above, the present invention provides an anonymous participation authority management system that allows a participant subsystem to anonymously participate in a plurality of sessions with a single registration procedure with a manager subsystem so as to be made available for electronic voting or electronic bidding, while concealing the participation relationship between sessions, and that allows a reception subsystem to verify that the participation data is data sent by an eligible participant subsystem authorized to participate and identify any duplicate participation data from the same participant subsystem.

The invention claimed is:

1. A system comprising:
   a participant subsystem that is authorized to anonymously participate in a plurality of sessions using secret information provided by a manager subsystem, all of said secret information being transmitted to the participant subsystem prior to participation in a first of said plurality of sessions, said secret information enabling participation in each of the plurality of sessions; and
   a reception subsystem;
   wherein the participant subsystem comprises:
      an anonymous signing section for authorizing particular individual data using the secret information depending on session-related information to produce anonymous participation data with an anonymous signature;
   wherein the reception subsystem comprises:
      an anonymous signature determining section for determining whether received data is said anonymous participation data with said anonymous signature; and
      a sender match determining section for determining whether anonymous signatures of two different pieces of anonymous participation data representing two different contents of individual data that are received in a same session of said plurality of sessions are signed by an identical participant subsystem; and
   wherein participation by said participant subsystem in a plurality of different sessions is concealed from said reception subsystem.

2. The system according to claim 1, wherein the anonymous signature includes data that is generated by a predetermined expression using the session-related information and the secret information, wherein the sender match determining section checks the data included in the anonymous signature of received anonymous participation data.

3. The system according to claim 2, wherein the predetermined expression is represented by raising a session-dependent base to a power that is dependent on the secret information.

4. The system according to claim 1, wherein the anonymous signing section authorizes the particular individual data based on a group signature scheme.

5. The system according to claim 1, wherein the anonymous signing section authorizes the particular individual data based on an escrowed identity scheme.

6. The system according to claim 1, wherein the anonymous signing section comprises:
   a generator creating section for creating a session-dependent generator depending on the session-related information;
   a group signing section for signing the particular individual data using the session-dependent generator and the secret information to produce the anonymous participation data, wherein the anonymous participation data includes data obtained by raising the session-dependent generator to a power determined by the secret information; and
   a linkage data generating section for generating linkage data indicating a relationship among the session-dependent generator and a generator determined by the particular individual data and/or the session-related information.

7. The system according to claim 6, wherein the secret information is represented by (x, y, v) that satisfies: $y=(y+\delta)^{1/e} \mod n$, where $y=a^x \mod n$, n is a product of two prime numbers as used in the RSA cryptography, g is a generator that generates a cyclic group of order n, a is an integer mutually prime to n, e is an integer mutually prime to the Euler number of n, and $\delta$ is a constant other than 1,
   the generator creating section creates a session-dependent generator $g_A$ corresponding to a session A and a generator $g_m$ is generated based on the individual data m and/or the session A,
   the group signing section sets $z=g_A{}^y$ and generates a first proof statement $$V_1 = SKLOGLOG(z, g_A, a)[\alpha: z=g_A{}^{(a^\alpha)}] \tag{1}$$

proving the knowledge of $\alpha$ satisfying $z=g_A{}^{(a^\alpha)}$, and a second proof statement $$V_2 = SKROOTLOG(z^*g_A{}^\delta, g_A, e)[\beta: z^*g_A{}^\delta = g_A{}^{(\beta^e)}] \tag{1}$$

proving the knowledge of $\beta$ satisfying $z^*g_A{}^\delta = g_A{}^{(\beta^e)}$,
   the linkage data generating section sets $z_1 = g_m{}^y$, and generates a third proof statement $$V_3 = SKREP(z_1/z, g_m/g_A)[\gamma: z_1/z=(g_m/g_A)^\gamma] \tag{1}$$

proving the knowledge of $z_1$ and z have the same power to the bases $g_m$ and $g_A$, respectively,
   wherein the anonymous participation data is defined as $(A, m, z, z_1, V_1, V_2, V_3)$.

8. The system according to claim 7, wherein
   the anonymous signature determining section checks $V_1$, $V_2$, and $V_3$ of the anonymous participation data to determine whether the received data is the anonymous participation data with the anonymous signature, and the sender match determining section checks z of the anonymous participation data to determine whether the anonymous signatures of the two different pieces of anonymous participation data representing the two different contents of individual data that are received in the same session of said plurality of sessions are signed by the identical participant subsystem.

9. The system according to claim 1, wherein the anonymous signing section comprises:
a generator creating section for creating a generator depending on the session-related information;
a group signing section for signing the particular individual data using the generator and the secret information to produce the anonymous participation data, wherein the anonymous participation data includes data obtained by raising the session-dependent generator to a power determined by the secret information.

10. The system according to claim 9, wherein the secret information is represented by (x, y, v) that satisfies: $v=(y+\delta)^{1/e}$ mod n, where $y=a^x$ mod n, the individual data is denoted by m, n is a product of two prime numbers as used in the RSA cryptography, g is a generator that generates a cyclic group of order n, a is an integer mutually prime to n, e is an integer mutually prime to the Euler number of n, and $\delta$ is a constant other than 1,
the generator creating section creates a session-dependent generator $g_A$ corresponding to a session A,
the group signing section sets $z=g_A^y$ and generates a first proof statement $$V_1 = SKLOGLOG(z, g_A, a)[\alpha: z = g_A^{(a^\alpha)}] \quad (m)$$

proving the knowledge of $\alpha$ satisfying $z = g_A^{(a^\alpha)}$, and a second proof statement $$V_2 = SKROOTLOG(z^* g_A^\delta, g_A, e)[\beta: z^* g_A^\delta = g_A^{(\beta^e)}] \quad (m)$$

proving the knowledge of $\beta$ satisfying $z^* g_A^\delta = g_A^{(\beta^e)}$,
wherein the anonymous participation data is designated as (A, m, z, $V_1$, $V_2$).

11. The system according to claim 10, wherein
the anonymous signature determining section checks $V_1$, and $V_2$ of the anonymous participation data to determine whether the received data is the anonymous participation data with the anonymous signature, and
the sender match determining section checks z of the anonymous participation data to determine whether the anonymous signatures of the two different pieces of anonymous participation data representing the two different contents of individual data that are received in the same session of said plurality of sessions are signed by the identical participant subsystem.

12. The system according to claim 1, wherein the anonymous signing section comprises:
a generator creating section for creating a session-dependent generator depending on the session-related information;
an escrow identifying section for signing the particular individual data using the session-dependent generator and the secret information to produce the anonymous participation data, wherein the anonymous participation data includes data obtained by raising the session-dependent generator to a power determined by the secret information; and
a linkage data generating section for generating linkage data indicating a relationship among the session-dependent generator and a generator determined by the individual data and/or the session-related information.

13. The system according to claim 12, wherein the secret information is represented by (a, b) that satisfies $b=(a^e-\delta)^{1/e}$ mod n, where n is a product of two prime numbers as used in the RSA cryptography, g is a generator that generates a cyclic group of order n, a is an integer mutually prime to n, e is an integer mutually prime to the Euler number of n, and $\delta$ is a constant other than 1,
the generator creating section creates a session-dependent generator $g_A$ corresponding to a session A and a generator $g_m$ is generated based on the individual data m and/or the session A,
the escrow identifying section sets $z_a = g_A^{(a^e)}$ and generates a first proof statement $$V_1 = SKROOTLOG(z_a, g_A, e)[\alpha: z_a = g_A^{(a^e)}] \quad (1)$$

proving the knowledge of $\alpha$ satisfying $z_a = g_A^{(a^e)}$, and sets $z^b = g_A^{(b^e)}$ and generates a second proof statement $$V_2 = SKROOTLOG(z_b, g_A, e)[\beta: z_b = g_A^{(b^e)}] \quad (1)$$

proving the knowledge of $\beta$ satisfying $z_b = g_A^{(b^e)}$, and
the linkage data generating section sets $z_c = g_m^{(a^e)}$ and generates a third proof statement $$V_3 = SKREP(z_c/z_a, g_m/g_A)[\gamma: z_c/z_a = (g_m/g_A)^\gamma] \quad (1)$$

proving the knowledge of $z_a$ and $z_c$ having the same power to the bases $g_A$ and $g_m$, respectively,
wherein the anonymous participation data is defined as (A, m, $z_a$, $z_b$, $z_c$, $V_1$, $V_2$, $V_3$).

14. The system according to claim 13, wherein
the anonymous signature determining section determines whether $z_a/z_b = g_A^\delta$ is satisfied and checks $V_1$, $V_2$, and $V_3$ of the anonymous participation data to determine whether the received data is the anonymous participation data with the anonymous signature, and
the sender match determining section checks one of $z_a$ and $z_b$ of the anonymous participation data to determine whether the anonymous signatures of the two different pieces of anonymous participation data representing the two different contents of individual data that are received in the same session of said plurality of sessions are signed by the identical participant subsystem.

15. The system according to claim 1, wherein the anonymous signing section comprises:
a generator creating section for creating a session-dependent generator depending on the session-related information; and
an escrow identifying section for signing the particular individual data using the session-dependent generator and the secret information to produce the anonymous participation data, wherein the anonymous participation data includes data obtained by raising the session-dependent generator to a power determined by the secret information.

16. The system according to claim 15, wherein the secret information is represented by (a, b) that satisfies $b=(a^e-\delta)^{1/e}$ mod n, where n is a product of two prime numbers as used in the RSA cryptography, g is a generator that generates a cyclic group of order n, a is an integer mutually prime to n, e is an integer mutually prime to the Euler number of n, and $\delta$ is a constant other than 1,
the generator creating section creates a session-dependent generator $g_A$ corresponding to a session A,
the escrow identifying section sets $z_a = g^{A(a^e)}$ and generates a first proof statement $$V_1 = SKROOTLOG(z_a, g_A, e)[\alpha: z_a = g_A^{(a^e)}] \quad (m)$$

proving the knowledge of α satisfying $z_a = g_A^{(a^e)}$, and sets $z^b = g_A^{(b^e)}$ and generates a second proof statement $$V_2 = SKROOTLOG(z_b, g_A, e)[\beta: z_b = g_A^{(b^e)}] \qquad (m)$$

proving the knowledge of β satisfying $z_b = g_A^{(b^e)}$, wherein the anonymous participation data is defined as $(A, m, z_a, z_b, V_1, V_2)$.

17. The system according to claim 16, wherein the anonymous signature determining section determines whether $z_a/z_b = g_A^\delta$ is satisfied and checks $V_1$ and $V_2$ of the anonymous participation data to determine whether the received data is the anonymous participation data with the anonymous signature, and the sender match determining section checks one of $z_a$ and $z_b$ of the anonymous participation data to determine whether the anonymous signatures of the two different pieces of anonymous participation data representing the two different contents of individual data that are received in the same session of said plurality of sessions are signed by the identical participant subsystem.

18. An anonymous participation authority management method for a system, the system comprising a participant subsystem that is authorized to anonymously participate in a plurality of sessions using secret information and a reception subsystem, the method comprising:

at the participant subsystem, a) authorizing particular individual data using the secret information depending on session-related information to produce anonymous participation data with an anonymous signature, all of said secret information being transmitted to the participant subsystem prior to participation in a first of said plurality of sessions, said secret information enabling participation in each of the plurality of sessions;

at the reception subsystem, b) determining whether received data is said anonymous participation data with said anonymous signature; and c) determining whether anonymous signatures of two different pieces of anonymous participation data representing two different contents of individual data that are received in a same session of the plurality of sessions are signed by an identical participant subsystem;

wherein participation by said participant subsystem in a plurality of different sessions is concealed from said reception subsystem.

19. The method according to claim 18, wherein the anonymous signature includes data that is generated by a predetermined expression using the session-related information and the secret information, wherein the step (c) is performed by checking the data included in the anonymous signature of the received anonymous participation data.

20. The method according to claim 19, wherein the predetermined expression is represented by raising a session-dependent base to a power that is dependent on the secret information.

21. The method according to claim 18, wherein the step (a) comprises the steps of:

creating a session-dependent generator depending on the session-related information;

signing the particular individual data using the session-dependent generator and the secret information to produce the anonymous participation data, wherein the anonymous participation data includes data obtained by raising the session-dependent generator to a power determined by the secret information; and generating linkage data indicating a relationship among the session-dependent generator and a generator determined by the particular individual data and/or the session-related information.

22. The method according to claim 18, wherein the step (a) comprises the steps of:

creating a session-dependent generator depending on the session-related information; and signing the particular individual data using the session-dependent generator and the secret information to produce the anonymous participation data, wherein the anonymous participation data includes data obtained by raising the session-dependent generator to a power determined by the secret information.

* * * * *